United States Patent Office 2,948,396
Patented Aug. 9, 1960

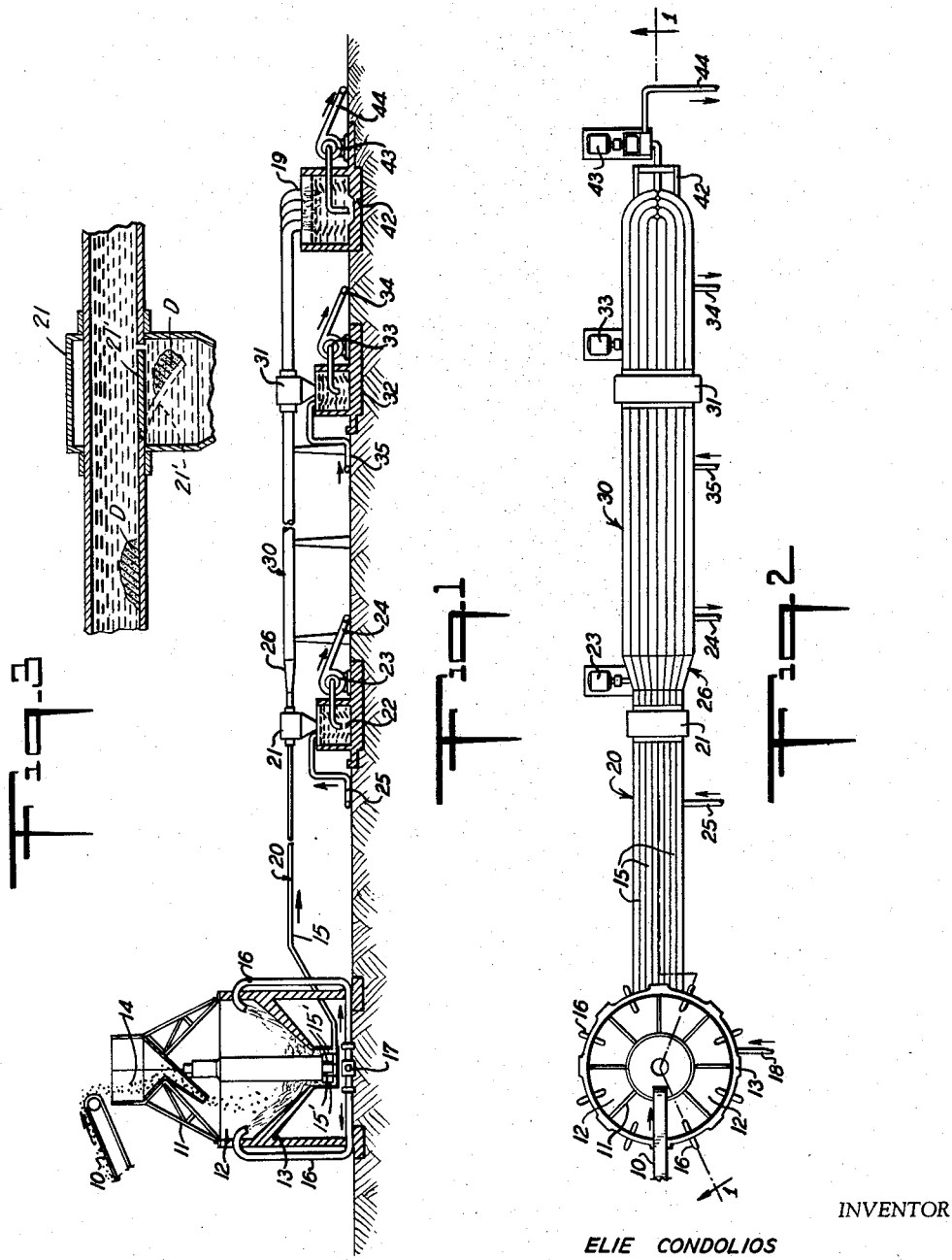

2,948,396

PROCESS AND APPARATUS FOR THE SORTING OF SOLID PRODUCTS

Elie Condolios, Grenoble, Isere, France, assignor to Etablissements Neyrpic, Grenoble, France, a corporation of France Filed Feb. 2, 1956, Ser. No. 563,172

Claims priority, application France Feb. 3, 1955

7 Claims. (Cl. 209—156)

The present invention has for an object a process and apparatus for wet sorting or classification of solid products according to the differences in the relative densities of the particles or the differences in the sizes of the particles or a combination of these two characteristics of the material which is subjected to the sorting treatment.

The hydraulic processes of sorting or classification heretofore practised have utilized the idea of velocity of fall of the solid particles in the liquid medium and in consequence the separation proceeds in accordance with the density and the size of the particles.

Systematic studies made by the applicant have shown that the value of the mean velocity at which a given solid material commences to deposit out of a flow of a liquid carrying medium flowing through a filled conduit of a given diameter is practically a function only of the density of the solid material when such material is capable of exhibiting the phenomenon of saltation, that is to say, those of which the particles have a diameter above 2 to $\frac{3}{10}$ of a millimeter (.008–.012").

The phenomenon of saltation is exhibited by solid particles having a diameter above .2 to .3 mm. The precise line of division between particles that will undergo saltation and those that will not varies somewhat according to the density of the material. This phenomenon may be illustrated by assuming that a quantity of a mineral or other solid material of a determined density heavier than the liquid carrying medium is introduced into a liquid flow circulating in a conduit at a velocity slightly below the point where the material begins to deposit out of the flow and settle to the bottom of the conduit. The settled particles will tend to collect on the bottom of the conduit in the form of a dune and with a conduit substantially horizontally inclined the dune will tend to displace itself in the direction of liquid flow at a velocity well below the given velocity of the liquid. The mechanism of the progression of the dune may be explained as follows:

Under the impulsion or pushing action of the liquid flow, the particles forming the rearward extremity of the dune progress in the direction of flow by short spurts or leaps above the others immediately adjacent to them and are carried forward for short distances by the current until they fall down again at the forward end of the slope and remain there until the whole mass of the dune has passed in like manner above them and so on in repetition of the movement.

I have further found that the phenomenon of dune formation is exhibited when a mixture of solid particles of varying sizes below several tenths of a millimeter in diameter is fed into a filled conduit through which a liquid is caused to flow at a velocity below the velocity at which the larger of the solid particles will remain in suspension in the liquid flow. The velocity of flow below which particles of a given size or a given density, as the case may be, will deposit out to form dunes at the lower side of the conduit will hereinafter be referred to as the "velocity limit of deposit."

The present invention which is based upon and which utilizes the above studies and observations, has for an object to provide an improved process of wet sorting or classification of solid materials, and particularly minerals of various kinds.

It is a further object of the invention to provide a novel arrangement of an apparatus useful for carrying out the above mentioned process of sorting.

The process of the present invention may be described in general terms as a method of sorting solid particulate materials where in the material to be sorted is introduced into a conduit through which a liquid is passed under a suitable head and at a velocity lower than the velocity limit of deposit of at least one of the constituents of the material and above the velocity limit of deposit of another constituent of the material so that the constituent which deposits less easily is carried along with the flow while the constituent which deposits more easily is caused to deposit and assume a dune formation within the conduit, and thereafter separately withdrawing the deposited constituent.

As previously stated the invention is applicable both to the densimetric sorting of solid materials and to granulometric sorting of such materials.

When the process is being conducted so as to effect a densimetric sorting a mixture of materials to be sorted is preferably introduced in a discontinuous manner into the flow of liquid passing through the conduit. Assuming that two materials of different density are involved, the liquid, usually water, is circulated through the conduit at a velocity between the respective velocities of deposit of the two materials making up the mixture.

Under these conditions the lighter material is entrained by the current while the heavier material deposits itself in the form of a dune which slowly progresses and which can be collected or drawn off by appropriate means. A small part of the particles of the lighter material may, however, remain included in the mass of the dune but these particles are sufficiently rapidly freed and entrained thanks to the mechanism of the progression of the dune that at the end of a short journey, suitably determined in each case, one can proceed according to the invention to collect the two materials perfectly separated.

When the material is composed of relatively fine particles, below several tenths of a millimeter in diameter, the mixture of particles is susceptible of being entrained by suspension in the liquid medium. Since in suspension the velocity limit of deposit is dependent upon the size of the grain or particles, the separation in a granulometric sorting may be effected by so adjusting the velocity of flow of the liquid medium that it is below the velocity limit of deposit of the larger particles or a particular range of the larger particles but at the same time is above the velocity limit of deposit of the still smaller particles. By thus regulating the velocity of flow of the liquid carrying medium, the larger particles will deposit in the lower part of the conduit and may thereafter be separately collected in various ways.

One form of apparatus that may be usefully employed in carrying out the process of the invention is shown, by way of example, in the attached drawing, wherein:

Fig. 1 is a part side elevation and part vertical section of a sorting apparatus that may be used in practising the process of the present invention, and is particularly designed for use in bringing about a separation of the material undergoing treatment in to the three different products;

Fig. 2 is a corresponding plan view of the installation; and

Fig. 3 is a detailed longitudinal sectional view of the upper portion of the means for withdrawing the separated material.

The apparatus will be more particularly described with respect to its use in bringing about a densimetric sorting, although it will be understood that it may be used in carrying on a granulometric sorting of a mixture of solid particles according to the particle size as distinguished from differences in density.

Referring more particularly to the drawings, the mixture to be separated is fed by means of an elevator 10 of the endless belt type into a rotatable distributor 11 which during its rotating movements diverts a suitable quantity of the materials of the mixture successively into each of the pockets 12 of a stationary supply basin 13 from which water as well as the material 14 are fed to a series of sorting conduits 15. As is indicated in Fig. 1 of the drawings, the inlet end 15' of each sorting conduit 15 is connected to the bottom of one of the pockets 12. The water can be brought as required into each of the pockets 12 by pipes 16 fed by the intermediary of a distributor 17 from a principal conduit 18.

In operation the rate of discharge of water to each of the pockets 12 is constant and such that the level establishes itself automatically in each pocket at a height such that the head created between the basin 13 and the outlet 19 of a corresponding sorting conduit 15 assures the passage of the mixture of the water and materials into a sorting conduit.

The mixture of water and materials passes into the first part 20 of the conduit 15 whereof the diameter at this point has been chosen such that the velocity of flow is below the velocity limit of deposit of the heaviest material. This material is deposited in the form of a dune which advances slowly. The other two constituents of the mixture remain in suspension and are entrained in the flow. The dune which is designated D in Fig. 3 of the drawings, progressively frees itself of lighter particles which have become entrapped in this mass finally arrives at the withdrawal device 21 which includes a wall section 21' of the conduit part 20 that is automatically depressed by a predetermined accumulation of solids thereon such as occurs when a dune D advances thereon (note Fig. 3). As the conduit wall section 21' is depressed under the weight of the dune, as shown in dotted outline in Fig. 3 of the drawings, the separated solids are withdrawn through the opening provided in the conduit by such depressed section 21' and the heaviest material is collected in a closed chamber 22 whence it is taken by hydraulic means and conducted with the aid of a pump 23 through pipe 24 to a place of storage. The water necessary for this transport is introduced through a conduit 25 provided with conventional means for regulating this discharge.

Immediately downstream from the withdrawal apparatus 21, the sorting conduit is provided with a divergent section 26 so designed as to bring its diameter to a value such that the velocity of the outflowing liquid becomes lower than the velocity limit of deposit of the material of medium density. This material, which in the first part 20 of the sorting conduit was transported in suspension, deposits itself in its turn in the second part 30 in the form of a dune which advances and arrives finally at another withdrawal device 31 which is analogous to the first and from which the material of medium density is transferred to the corresponding collecting box 32 which is similarly associated with pump 33, transporting pipe 34 and conduit for supplying water 35.

The lightest material, still entrained in suspension, passes off with the flow from the extremity 19 of the sorting conduit into a box 42 whence it is withdrawn with the aid of a pump 43 and pipe 44 to its place of storage.

I claim:

1. Process for the sorting of mixtures of solid materials whereof one constituent has a different velocity limit of deposit from another constituent which comprises supplying liquid in sufficient amount to fill a lengthy conduit with a continuous flow of the liquid, intermittently introducing said mixture in separate amounts into the liquid supplied to said conduit, circulating the liquid through such conduit at a velocity between the respective limits of deposit of the constituents to be separated to cause the constituent having the greater tendency to deposit in each separate amount of such mixture to deposit in the form of a dune on the bottom of the conduit, the velocity of flow of the liquid being such as to cause the deposited constituents forming the dune mass to move within the area of the mass so that the mass as a whole advances along the bottom of the conduit and so that as the dune mass advances the constituents having less tendency to deposit entrapped therein are freed therefrom and entrained by suspension in such liquid, continuing such advancement of each dune mass as a whole along the conduit until such mass has turned over a plurality of times upon itself and during such repeated turning has substantially freed itself of the constituents having less tendency to deposit entrapped therein and becomes composed substantially entirely of the more readily deposited constituent, and withdrawing the whole of such resulting dune mass from the liquid flow at a single place of withdrawal at the end of such path of advancement of the dune mass.

2. Process according to claim 1 wherein the mixture of solid materials contains constituents of different densities and wherein the liquid is circulated at a velocity below the velocity limit of deposit of the heavier of said constituents and such as to cause said heavier constituent in each separate amount of such mixture to deposit out of the liquid flow and form such dune, and withdrawing the deposited material from the liquid flow.

3. Process according to claim 1 wherein the mixture of solid materials contains constituents of different particle sizes and wherein, the liquid is caused to circulate at a velocity between the respective velocity limits of deposit of the constituents of different particle size, and such as to cause the constituents of larger particle size in each separate amount of such mixture to deposit out of the liquid flow and form such dune, and withdrawing the deposited material from the liquid flow.

4. Process according to claim 1 wherein the mixture contains at least three constituents of different velocity limits of deposit and wherein following the separation of the constituent having the greatest tendency to deposit, the velocity of flow of the liquid and remaining constituents in each separate amount of such mixture is reduced at a place spaced in advance of said dune to a value below the velocity limit of deposit of that one of the remaining constituents which has the lowest velocity limit of deposit to cause said constituent of lowest velocity limit of deposit to deposit out of the liquid flow in the form of a second dune, maintaining the velocity of the liquid in the region of such dune such as to cause the liquid to exert a sufficient pushing action on the deposited material in such second dune to advance such second dune and to free therefrom entrapped particles of the constituents having the least tendency to deposit, continuing such advancing of said second dune mass as a whole along the conduit until such mass has turned over a plurality of times upon itself and during such repeated turning has substantially freed itself of the constituents having the least tendency to deposit entrapped therein and becomes composed substantially entirely of the constituents of lowest velocity of deposit, and withdrawing the whole of such resulting second dune mass from the liquid flow at a single place of withdrawal at the end of such path of advancement of the second dune mass.

5. Process for separating constituents of a mixture of solid particulate materials, a given constituent of said mixture having a higher velocity limit of deposit than another constituent of said mixture, which comprises intermittently introducing said mixture in successive, separate amounts into a liquid flowing at a velocity higher than the velocity limit of said given constituent and lower than the velocity limit of said other constituent and such as to cause said other constituent to be deposited out of said liquid flow substantially in separate amounts and as to cause the liquid to exert a sufficient pushing action on the material in such separate deposited amounts to advance such separate deposited amounts in the direction of flow of the liquid and to free particles of said given constituent entrapped in such separate deposited amounts, and continuing the advancement of each such separate amount until the latter has become substantially free of said particles of said given constituent and is composed substantially entirely of particles of said other constituent, and successively withdrawing said advancing separate amounts of said other constituent as a whole from said liquid flow at a given place of withdrawal located a considerable distance downstream from the place of introduction of said mixture and such that said separate amounts are enabled to substantially free themselves of said given constituent in their advancement thereto.

6. Process for separating constituents of a mixture of solid particulate materials, a given constituent of said mixture having a higher velocity limit of deposit than another constituent of said mixture which comprises intermittently introducing said mixture in successive, separate amounts into a liquid flowing at a velocity higher than the velocity limit of said given constituent and lower than the velocity limit of said other constituent and such as to cause said other constituent to be deposited out of said liquid flow in successive separate amounts as dunes and as to cause the liquid to exert a sufficient pushing action on the material in such separate dunes to effect successive movement of said dunes in the direction of the liquid flow concomitantly with saltation of the particles constituting said dunes, and entrainment of entrapped particles of said given constituent released from such separate dunes, continuing such movement of each of such dunes until the latter has become substantially free of said particles of said given constituent and is composed substantially entirely of particles of said other constituent and successively withdrawing said advancing dunes of said other constituent as a whole at a given location along the lines of liquid flow substantially spaced from the location of said introduction of said mixture in the direction of the liquid flow, the distance of said given location of withdrawal from said location of introduction being at least such that said dunes are enabled to substantially free themselves of said given constituent in their movement thereto.

7. The process of separating constituents of a mixture of solid particulate materials in which one constituent thereof has a greater density and/or particle size than another constituent of said mixture, which comprises intermittently introducing separate amounts of said mixture into a fluid flowing in a conduit at a predetermined controlled velocity at the place of entry of said mixture, controlling the velocity of flow of said fluid at a portion of the longitudinal path of flow thereof so that the flow of fluid through such path portion shall be at a velocity which is below that required to sustain said one constituent in suspension in the fluid and such as to cause the major part of said one constituent of the mixture entering such path portion to deposit on the bottom of the conduit in such path portion in the form of a dune, and which velocity is above that required to entrain said other constituent and such as to enable said fluid to carry the major part of said other constituent of the mixture entering such path portion out of such path portion, and maintaining the velocity of the fluid in the region of the dune sufficiently high to cause the impulsion of the fluid flow on the dune to advance the entire mass of the latter along the conduit, to agitate the materials of the advancing dune mass to release particles of said other constituent which may have become entrapped in the dune by the depositing particles of said one constituent as said dune advances and to cause the fluid flow to entrain such released particles, continuing such impulsion of the fluid flow on the dune mass until the latter has become substantially free of said particles of said other constituent and is composed substantially entirely of particles of said one constituent, and then removing the resulting dune mass in its entirety from the fluid.

References Cited in the file of this patent

UNITED STATES PATENTS

| | | |
|---|---|---|
| 919,246 | Ross | Apr. 20, 1909 |
| 1,100,971 | Hambric | June 23, 1914 |
| 1,811,408 | Stebbins | June 23, 1931 |
| 2,022,585 | Chance | Nov. 26, 1935 |
| 2,236,165 | Buskirk et al. | Mar. 25, 1941 |